United States Patent Office 3,686,121
Patented Aug. 22, 1972

3,686,121
HYDROCARBON CONVERSION CATALYST
Charles N. Kimberlin, Jr., and Elroy M. Gladrow, East Baton Rouge, La., assignors to Esso Research and Engineering Company
No Drawing. Filed Dec. 29, 1969, Ser. No. 888,975
Int. Cl. B01j *11/40;* C10g *11/02*
U.S. Cl. 252—455 Z                  7 Claims

ABSTRACT OF THE DISCLOSURE

Improved hydrocarbon conversion catalyst comprises at least two crystalline aluminosilicate zeolites having essentially the same crystal structures, but having substantially different $SiO_2/Al_2O_3$ molar ratios. Mixtures of zeolites X and Y are preferred, particularly when embedded in a matrix including clays and/or silica-alumina.

BACKGROUND OF THE INVENTION

Field of the invention

The present invention deals with improved means for upgrading hydrocarbon oil streams. More particularly, it deals with a process wherein a hydrocarbon feed or a selected portion thereof is upgraded by contacting with a mixture of two or more specific types of crystalline alumino-silicate zeolites at conversion conditions. Still more particularly, the present invention is concerned with improved catalysts useful for these hydrocarbon conversion processes.

Description of the prior art

It is, of course, well known in the art to improve the quality of various hydrocarbon oils by treating them with catalysts under varying conversion conditions to effect such reactions as cracking, hydrocracking, hydrofining, aromatization, etc. Moreover, the use of crystalline alumino-silicate zeolites having effective uniform pore diameters which may range from 4 to 15 angstroms, as adsorbents for hydrocarbon streams is now well known. Thus, selected fractions of the hydrocarbon streams have in the past been adsorbed on the crystalline zeolites. The adsorbents are then treated with a desorbing agent to remove a concentrated stream of adsorbed components and the adsorbed components are then sent to a conversion operation. For example, a hydrocarbon fraction containing straight-chain and branched-chain hydrocarbons could be subjected to an adsorption step employing calcium alumino-silicate zeolites such as Linde 5A, offretite, etc. as adsorbents to adsorb the straight chain hydrocarbons. The adsorbents are then desorbed, i.e., the large portion of adsorbed straight-chain hydrocarbons taken from the initial hydrocarbon feed freed from the adsorbent, and the recovered stream of normal paraffins, etc., passed to a hydrocarbon conversion zone, such as an isomerization zone.

In addition to their use as highly efficient adsorbents, crystalline alumino-silicate zeolites have recently gained wide acceptance as catalysts for organic conversion reactions and, in particular, hydrocarbon conversion reactions. Among the processes in which these crystalline zeolitic materials are effective catalysts are catalytic cracking, hydrocracking, hydroisomerization, isomerization, reforming, hydroforming, aromatization, alkylation, dealkylation, hydrogenation, disproportionation, hydrodesulfurization, denitrogenation, and the like. These zeolitic materials are characterized by highly ordered crystalline structures and uniformly-dimensioned pores, and are readily distinguishable from each other on the basis of their composition, crystal structure, adsorption properties, and the like. A number of these zeolite materials are described, for example, in U.S. Pat. Nos. 3,013,982–86. For use in hydrocarbon conversion processes, it is usually necessary to reduce the initial alkali metal content of the crystalline zeolites by replacing their alkali metal content with other metals or hydrogen-containing components which are more conducive to promotion of the desired conversion reaction. Reduction of alkali metal content is readily accomplished by ion-exchange procedures wherein a desired cation is introduced into the zeolitic structure to replace the alkali metal cation initially present. In this manner various degrees and types of catalytic activity can be conferred on the zeolitic materials, depending on the particular cation introduced.

These crystalline alumino-silicate zeolites are characterized by their highly ordered crystalline structure, and have pores of nearly uniform dimensions in the range of about 4 to 15 angstroms. These crystalline molecular sieves have an aluminosilicate anionic cage structure in which the alumina and silica tetrahedra are intimately connected to each other. Metal cations or hydrogen are distributed throughout the structure to maintain electrical neutrality. The highly ordered dispersion of the silica and alumina tetrahedra makes for a large number of active sites, and the uniform pore openings of 4 to 15 angstrom units allow for easy ingress of various hydrocarbon feed types, as well as egress of the reaction products which may be formed by contact with the sieves.

The large pore zeolites, i.e., having effective pore diameters of 6 to 15 angstroms, are preferred when olefins, cyclic or aromatic constituents, or sulfur, oxygen or nitrogen-comprising compounds are to be converted. A naturally occurring example thereof is the mineral faujasite. Synthetically produced aluminosilicates of the faujasite structure are also available, and are known as zeolites X and Y as described in U.S. Pats. 2,882,244 and 3,130,007, respectively. In addition to these large pore zeolites, crystalline zeolites having uniform pore openings of less than about 6 angstrom units, e.g. 4 to 5 angstrom units, are available and are preferred for conversion processes wherein normal paraffins are to be the feed to the reaction zone.

The chemical formula of the anhydrous crystalline alumino-silicate zeolites, expressed in terms of moles of oxides, may be represented as:

$$0.9 \pm 0.2 M_{\frac{2}{n}}O : Al_2O_3 : W SiO_2$$

wherein M is one or more metal cations, $n$ is its valence, and W is a number from 1 to 14, preferably 2 to 12. In the synthetic form, prior to ion exchange, the metal cation is usually an alkali metal such as sodium. With zeolite Y, for example, W in the above formula is above about 3, preferably 3 to 6, most preferably 4 to 5.5 and for synthetic zeolite X, W is above about 2, preferably 2 to 3.3, most preferably 2.3 to 3.0, these zeolites having uniform pore openings in the range of about 6 to 15, preferably 6 to 13 angstrom units.

The relatively small pore size zeolites have uniform pore openings of less than 6, preferably 5 angstroms, and are also well known, being available in their synthetic or natural forms. For example, a suitable starting material, referred to as "zeolite A" in U.S. Pat. No. 2,882,243, has a molar formula (dehydrated form) of

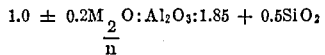

where M is a metal, usually sodium, and $n$ is its valence. It may be prepared by heating a mixture containing $Na_2O$, $Al_2O_3$, $SiO_2$, and $H_2O$ (supplied by suitable source materials) at a temperature of about 100° C. for 15 minutes to 90 hours or longer. Suitable ratios of these reactants are fully described in the aforementioned patent. The product produced by conventional procedure will have uniform pore openings of about 4 angstroms as produced in the sodium form. They may then be converted to products having uniform pore openings of about 5 angstroms by replacement of the sodium via conventional ion-exchange techniques with various cations, such as calcium, magnesium, cobalt, nickel, iron, manganese, etc. Natural zeolites having effective pore diameters less than about 6 angstroms, and preferably about 5 angstroms, are also herein contemplated, and are represented by such materials as erionite, chabazite, clinoptilolite, etc. Thus both the natural and synthetic varieties of 5-angstrom zeolites are contemplated with the only limitation being one of crystal structure and the ratio of $SiO_2$ to $Al_2O_3$ therein.

While the use of the above crystalline alumino-silicate zeolite materials as adsorbents and, more recently, as catalysts has been successful in the upgrading of hydrocarbon feed streams, it will be readily appreciated that in certain applications the desired activity and stability cannot be obtained.

SUMMARY OF THE INVENTION

It is accordingly an object of the present invention to provide catalytic compositions which have improved activity and stability.

In accordance with the present invention it has unexpectedly been discovered that catalysts of synergistically improved activity and stability are obtained when these catalysts comprise a mixture of two or more crystalline alumino-silicate zeolites having the same crystal structure but differing in the molar ratios of $SiO_2$ to $Al_2O_3$ present in each such component.

Thus, in accordance with a preferred aspect of the present invention a catalyst of surprising activity and stability is obtained comprising a mixture of the synthetic zeolites X and Y, both having a crystal structure similar to that of the natural occurring mineral faujasite, but zeolite X having a $SiO_2/Al_2O_3$ ratio of from 2.3 to 3.0, and zeolite Y having a $SiO_2/Al_2O_3$ ratio of from 4.0 to 5.5.

DETAILED DESCRIPTION

The catalyst mixture of the present invention comprises two or more crystalline alumino-silicate zeolites having crystal structures which are essentially the same, but having molar ratios of silica to alumina which are different. It is preferred that the ratios of silica to alumina of each component zeolite will vary from that of the closest such ratio possessed by another of the zeolites in admixture therewith by a factor of at least 1.0. That is, the $Sio_2O/Al_2O_3$ ratio of the zeolite having the smaller such ratio will be a factor of 1.0 less than the molar ratio of $SiO_2/Al_2O_3$ of the zeolite having the next larger such ratio in the mixture.

Generally these crystalline zeolites are prepared by having present in the reaction mixture, $Al_2O_3$ as sodium aluminate, alumina sol, and the like; $SiO_2$ as sodium silicate and/or silica gel and/or silica sol; and alkaline hydroxide, either free or in combination with the above components. Careful control is kept over the pH, the alkali metal ion concentration of the mix, as well as the proportions of silica to alumina and alkali to silica, the crystallization period, etc. all in a known manner. A general scheme for preparing large pore crystalline alumino-silicate zeolites woul be as follows:

Colloidal silica, such as silica hydrosol, for example, commercial Ludox, is mixed with a solution of sodium hydroxide and sodium aluminate at ambient temperatures. The reaction mixture may be allowed to digest at ambient temperatures for periods of up to 40 hours or more, e.g., 24 hours. The reaction mixture is then heated to 180° to 250° F., preferably 200° to 220° F., for a period of 24 to 200 hours or more, preferably 50 to 100 hours, in order to effect crystallization. The crystalline metallic alumino-silicate may then be decanted and washed.

As hereinbefore mentioned, for use as a catalyst these crystalline alumino-silicate zeolites are customarily base exchanged with a desired cation to replace alkali metal initially present in the zeolite as found naturally or as synthetically prepared. Thus, in the original zeolite, M in the above formula is usually an alkali metal, such as sodium, and is replaced by base exchange with a suitable cation or mixture of cations so that the alkali metal oxide content of the zeolite is reduced. The exchange treatment should usually be sufficient to reduce the zeolitic alkali metal content, e.g., sodium and/or potassium content, to less than about 10 wt. percent (as $Na_2O$), preferably less than about 4 wt. percent, and most preferably to within the range of about 0 to 2 wt. percent $Na_2O$. The purpose of the base exchange procedure is to substantially remove alkali metal cations, which have been found to be deleterious to hydrocarbon conversion reactions, as well as to introduce particularly desired catalytic activity by means of the various cations utilized in the exchange medium. For catalytic applications suitable cations for exchanging the zeolite include hydrogen-containing cations, e.g., ammonium ions, and cations of metals in Groups I–B to VIII of the Periodic Table of the Elements and the rare earth metals, preferably cations of metals in Groups II, III, IV, V, VI–B, VII–B, VIII, and the rare earth metals, and mixtures thereof. With compositions used as cracking catalysts, the rare earth metals are particularly preferred. More than one cation may be introduced by the use of cation mixtures or by successive exchange treatments. Preferred cations include hydrogen or hydrogen-containing cations, e.g. ammonium ion, and magnesium, cobalt, nickel, zinc, calcium, cadmium, copper, iron, the aforementioned rare earths, and barium cations. Hydrogen-containing and/or magnesium and/or zinc and/or rare earth cations will be particularly preferred. Ion exchange is accomplished by conventional contact of the zeolite with a suitable salt solution of the desired cation, such as the sulfate, chloride, nitrate, etc.

Where the mixture of crystalline zeolites are to be employed as a catalyst in hydro-conversion processes, such as hydrocracking, hydroisomerization, hydrogenation, etc., it will be necessary to employ suitable hydrogenation components supported on the zeolites. Catalytic metals which may be composited with the above base-exchanged crystalline zeolite mixture can be any of the well-known catalytic metals customarily employed in organic conversion processes, particularly hydrocarbon conversion processes. Such metals, for example, will include platinum, palladium, iridium, rhodium, iron, cobalt, nickel, manganese, tungsten, titanium, zirconium, vanadium, hafnium, zinc, cadmium, tin, lead, aluminum, chromium, molybdenum, etc. For hydrocracking reactions it has been found most preferable to impregnate the crystalline zeolites with a platinum group metal, i.e., metals of the platinum and palladium series of the Periodic Table, preferably platinum or palladium, and most preferably palladium. The base exchanged crystalline zeolites can be composited with a platinum group metal, for example, by treatment with a solution of a platinum group metal salt or ammonium complex, e.g., ammonium chloroplatinate, platinum tetraaminedichloride, chloroplatinic acid, ammoniacal palladium chloride, etc., to thereby incorporate a catalytic amount of the metal. Following such incorporation the catalyst can be subjected to a reducing step by treatment in a hydrogen atmosphere to thereby reduce the metal to its elemental form in a fine uniform dispersion.

The essence of the present invention which distinguishes over the prior art teachings resides in the use of at least two different types of zeolites, preferably having substantially different silica/alumina molar ratios, and having crystal structures which are essentially the same.

When the mixture of crystalline zeolites of differing $SiO_2$ over $Al_2O_3$ ratios, but having similar crystal structure is employed in hydro-techniques, such as hydrocracking, hydroisomerization, hydrodesulfurization, hydrodenitrogenation, hydrogenation, etc., it is not necessary that both zeolites contain an added hydrogenation component. While the hydrogenation component can be composited with the overall catalytic composition, it is also contemplated that each zeolitic component can be separately combined with the hydrogenation metal or that only one of the zeolite components be so combined. The preferred hydrogenation component in either case will be a platinum group metal, such as palladium. Preferred amounts of platinum group metal will fall in the range of about 0.1 to 6 wt. percent, e.g., 0.4 to 2.0 wt. percent, based on each dry zeolite component.

Another embodiment of the present invention contemplates that the admixture of the zeolites of the present invention be incorporated into an inorganic oxide matrix. In this way the zeolite crystals are suspended in and distributed throughout the inorganic oxide matrix. Such a catalyst is characterized by a high resistance to attrition, high activity and exceptional selectivity and steam stability. It can be readily prepared, for example, by dispersing the two or more types of zeolite crystals in a suitable siliceous sol and gelling the sol by various means. The inorganic oxide which serves as the "matrix" in which the above crystalline zeolites are uniformly distributed, i.e. "encapsulated," include silica gel, per se, or more preferably a cogel of silica and an oxide of at least one metal selected from the group consisting of metals of Groups II-A, III-A and IV-B of the Periodic Table; as set forth on pp. 394 and 395 of the Handbook of Chemistry and Physics, 38th ed. (1956–57). The terms "gel" and "cogel" as used herein are intended to include gelatinous precipitates, hydrosols, hydrogels, etc. Suitable cogels include, for example, silica-alumina, silica-magnesia, silica-zirconia, silica-thoria, silica-berylla, silica-titania, as well as ternary combinations such as silica-alumina-zirconia, silica-alumina-magnesia, silica-magnesia-zirconia, etc. Preferred cogels will include silica-alumina, silica-alumina-zirconia, and silica-magnesia, with silica-alumina being particularly preferred. These gels and cogels will generally comprise a major proportion of silica and a minor proportion of the other aforementioned oxide or oxides. Thus the silica content of the siliceous gel or cogel matrix will generally fall within the range of 55 to 100 wt. percent, preferably 60 to 90 wt. percent, and the other metal oxide or oxides content will generally fall within the range of 0 to 45 wt. percent, preferably 10 to 40 wt. percent. For the particularly preferred silica-alumina matrix, the alumina content will preferably be about 8 to 40 wt. percent, preferably 12 to 30 wt. percent. Siliceous hydrogels utilized herein, e.g. silica-alumina hydrogel or gelatinous co-precipitates, can be produced by any of a number of known methods. They may be used as commercially supplied or may be separately prepared. For example, siliceous hydrogels can be prepared by hydrolysis of ethylorthosilicate, acidification of an alkali metal silicate containing a compound of the metal desired in the ultimate cogel, etc. Thus a suitable silica-alumina hydrogel can be produced by preparing a hydrous precipitate of silica by mixing a solution of sodium silicate with an acid, e.g. sulfuric acid, to produce a slurry having pH below 9, usually below about 7; then adding a solution of an aluminum salt, e.g. aluminum sulfate; and adjusting the pH of the mixture to above about 4 by addition of alkaline material, e.g., ammonia, in order to precipitate alumina.

In addition to the above it is contemplated that the "matrix" can also comprise natural or synthetic clays, such as kaolin type clays, montmorillonite, bentonite, halloysite, etc.

In addition, the "matrix" may consist of a combination of any of the members of these two types of matrixes described above.

The zeolite-matrix compositions are prepared by intimately admixing the aforedescribed crystalline aluminosilicate zeolites with the siliceous hydrogel, clay or mixtures thereof, and thereafter obtaining a composite product comprising the zeolitic components uniformly distributed throughout and suspended in the inorganic oxide matrix.

The formation of the encapsulated zeolite catalyst can be achieved by various means. For example, aluminosilicate zeolite crystals can be dispersed in a siliceous hydrosol or in one of the reactants used in forming the hydrosol where the hydrosol is characterized by a short gelation time. This procedure is described in U.S. Pat. No. 3,140,249, which specifies the weight mean particle diameter of the alumino-silicate required to produce the desired strength and diffusivity of the products. The siliceous hydrosol containing the zeolite crystals is then allowed to set after a suitable period of time forming the zeolite-gel matrix product, and the gelled product can thereafter be dried either by spray drying to give microspheres in the 20–100 micron size range or by tray drying and breaking into pieces of desired size. Alternatively, the gel may be extruded or pelleted to obtain uniformly shaped pieces. Also, the hydrosol can be introduced into the perforations of a perforated plate, retained therein until the sol sets to a hydrogel, followed by removal of the hydrogel pieces from the plate. Further, spheroidal particles can be obtained by methods as described, for example, in U.S. Pat. No. 2,384,946. These methods involve introducing globules of hydrosol into a column of water-immiscible liquid, e.g. an oil medium. The globules of hydrosol set to a hydrogel and subsequently pass into a bottom water layer from which they are recovered. The use of spherically-shaped particles is of particular advantage in moving bed and fluidized bed hydrocarbon conversion processes.

While the matrix type compositions of the invention can be prepared by any of the above methods, it will be particularly preferred to subject the mixture of crystalline zeolite and siliceous hydrogel, after suitable homogenization (e.g. by passage through a colloid mill to produce a fine dispersion) to a rapid evaporation technique, such as spray drying, flash drying, etc. The spray drying step comprises spraying the composite mixture through nozzles into a tower containing hot flowing gases of a temperature at the nozzles in the range of about 400° to 1100° F. This procedure is desirable because of increased attrition resistance achieved due to the spherical nature of the particles obtained, as well as the excellent particle size distribution useful in fluidized bed processes, e.g., predominantly 20 to 80 micron average particle diameter. A highly porous solid is thus obtained having improved attrition resistance.

As mentioned, the mixture of two or more zeolites of the present invention can be employed per se or combined in a suitable inorganic oxide matrix. Where a matrix is utilized, and the catalyst is to be used in catalytic cracking operations, the total amount of crystalline zeolite (of the two or more types) will generally be in the range of about 5 to 20 wt. percent, preferably 6 to 16 wt. percent, most preferably about 8 to 15 wt. percent, based on the total catalytic composition. In the encapsulated form contemplated herein, the aforedescribed base exchange of the zeolites to replace their initial alkali metal content, and impregnation with hydrogenation metal component, can be accomplished either prior or subsequent to incorporation of the zeolites into the matrix.

Where the mixture of zeolites is used without a supporting matrix, the two or more zeolites are preferably ground or milled together and then granulated or pelleted for use. Alternatively, the two zeolites may be separately pelleted or granulated followed by mixing of the pellets or granules. With or without the matrix component, the ratio of the zeolite having the higher $SiO_2/Al_2O_3$ mole ratio to that of the zeolite having the lower $SiO_2/Al_2O_3$ mole ratio will generally be within the range of from about 0.3/1 to 3/1, preferably 0.5/1 to 1.5/1. Where the zeolites employed are zeolites X and Y, the ratio of Y/X will preferably be from 1.0 to 2.4, most preferably about 1.3.

The operating conditions to be employed in the practice of the present invention will, of course, vary with the particular conversion reaction desired. The following table summarizes typical reaction conditions effective in the present invention.

| Principal conversion desired | Reaction conditions | | | |
|---|---|---|---|---|
| | Temperature, °F. | Pressure, p.s.i.g. | Feed rate, v./v./hour | Hydrogen rate, s.c.f./bbl. |
| Hydrofining | 500–580 | 200–2,000 | 0.1–10.0 | 500–10,000 |
| Hydrocracking | 450–850 | 200–2,000 | 0.1–10.0 | 500–10,000 |
| Aromatization | 800–1,100 | 0–50 | 0.1–10.0 | 0–10,000 |
| Hydroisomerization | 300–700 | 100–1,000 | 0.5–20.0 | 500–10,000 |
| Catalytic cracking | 700–1,000 | 0–50 | 0.1–20.0 | 0 |
| Hydrodealkylation | 700–1,200 | 50–1,000 | 0.5–20.0 | 500–10,000 |
| Catalytic reforming | 850–1,000 | 50–1,000 | 0.1–20.0 | 500–10,000 |

The feedstock suitable for conversion in accordance with the invention includes any of the well-known feeds conventionally employed in hydrocarbon conversion processes. Usually they will be petroleum derived, although other sources such as shale oil are not to be excluded. Typical of such feeds are included heavy and light virgin gas oils, heavy and light virgin naphthas, solvent extracted gas oils, coker gas oils, steam-cracked gas oils, middle distillates, steam-cracked naphthas, coker naphthas, catalytically-cracked naphthas, cycle oils, deasphalted residua, etc.

The invention will be further understood from the following examples, which are not intended to be limiting.

EXAMPLE 1

A specific example of the mixed zeolite catalyst of the present invention was prepared as follows:

In a beaker, 10.0 grams of Y-type faujasite and 6.0 grams of X-type faujasite (dry basis) were slurried in 100 cc. $H_2O$. In a second beaker, 67 grams of kaolin clay (Huber SD Hydrofine grade—dry basis) were slurried with 500 cc. $H_2O$. The mixed-sieve slurry from the first beaker was then added to the second beaker, with stirring, and the composite was colloid milled. In a third vessel, 1135 grams of unwashed silica/alumina hydrogel (10.3 wt. percent catalytic solids) was blended with 500 cc. $H_2O$. This component was then added to the mixed sieve-clay slurry, the composite was colloid milled, oven dried and then ground in a mill. This material was then washed with 3% ammonium sulfate solution (pH 8) several times in order to remove residual soda ($Na_2O$), rinsed well with water, and then slurried in a dilute mixed rare earth chloride solution[1] for 15 minutes. It was then filtered, rinsed with water, and oven dried.

The amount of rare earth used was equivalent to about 1.5 wt. percent (as $RE_2O_3$) based on the total catalyst.

[1] The mixed rare earth chlorides were principally cerium (~50%), lanthanum (~25%), neodymium (~16%), praseodymium (~6%) and the remainder samarium, gadolinium and other rare earths.

This catalyst, designated catalyst A thus comprised about 5% Y-type faujasite, 3% X-type faujasite, 33.5% kaolin, and 58.5% silica/alumina.

EXAMPLE 2

In order to demonstrate the unexpected synergistic superiority of the catalyst composition of the present invention, several additional catalysts were prepared for purposes of comparison, as follows:

Catalyst B was prepared in the same manner as catalyst A above, except that all Y-type faujasite and no X-type faujasite was employed in the preparation thereof. Thus, catalyst B, so prepared, had a total zeolite content approximately the same as that of catalyst A, and had a composition comprising about 7.3% Y-type faujasite, 33.0% kaolin, and 59.7% silica/alumina.

Catalyst C is an example of a commercially available catalyst. This catalyst comprises about 8–10% of rare earth X-type faujasite, about 45% clay, and about 45–47% silica/alumina. Thus, as compared to catalysts A and B, catalyst C is one having all X-type faujasite as its zeolite component.

Catalyst D was prepared in the same manner as catalyst A above, except that no X-type faujasite was utilized. Thus, catalyst D had a composition comprising 5% Y-type faujasite, 35% kaolin, and 60% silica/alumina.

Catalysts A, B, C and D all contained rare earths.

EXAMPLE 3

Each of the above-described catalysts was then prepared for use in a hydrocarbon conversion reaction. Thus, catalysts A, B, C and D were each calcined at 1,000° F. in ambient air, and then treated with steam at 1,400° F. and 0 p.s.i.g. for 16 hours. These catalyst were then tested for their cracking performance in a batch fluid bed type operation, in which a 500–700° F. virgin gas oil was fed into the reactor, at 950° F. over a 2 minute process period. The following table compares the catalyst's performance at a common conversion level of 60 wt. percent;

| Catalyst | A | B | C | D |
|---|---|---|---|---|
| Steamed at, 1,400° F.: | | | | |
| W./hr./w | 7.2 | 7.5 | 6.0 | 5.0 |
| Carbon, weight percent | 1.0 | 1.0 | 1.2 | 1.1 |
| $C_5$/430° F., weight percent | 44.2 | 43.6 | 42.6 | 42.5 |
| Steamed at, 1,500° F.: | | | | |
| W./hr./w | 3.3 | 2.8 | 0.8 | 1.2 |
| Carbon, weight percent | 1.0 | 1.0 | 5.0 | 2.3 |
| $C_5$/430° F., weight percent | 43.8 | 43.0 | 33.5 | 38.5 |

These data show that, after steaming at 1,400° F., the mixed zeolite catalyst A of the present invention is about as active as the high Y-type zeolite catalyst B, and indicates a higher selectivity to $C_5+$ gasoline.

Catalyst A is shown to be definitely more active and selective than the high X-type zeolite catalyst C and the corresponding 5% Y-type zeolite content catalyst D.

After steam treatment at 1,500° F., the differences in these catalysts, and the superiority of catalyst A of the present invention, becomes much more evident. Catalyst A is more active and selective than B, and very much more so than either catalyst C or D. Thus, it is evident that a synergism has developed between the X and Y-type faujasites in catalyst A, which results in a superior catalyst.

What is claimed is:

1. A composition having catalytic properties comprising at least two crystalline aluminosilicate zeolites having a crystal structure of the faujasite type one of said crystalline aluminosilicate zeolites having a $SiO_2/Al_2O_3$ molar ratio which is greater than the $SiO_2/Al_2O_3$ molar ratio of the other of said crystalline aluminosilicate zeolites by at least 1.0.

2. The composition of claim 1 which additionally comprises a hydrogenation component.

3. The composition of claim 2 wherein said hydrogenation component is a platinum group metal.

4. The composition of claim 1 wherein said zeolites are suspended in and distributed throughout an inorganic oxide matrix.

5. The composition of claim 4 wherein said matrix comprises a clay.

6. The composition of claim 1 wherein the proportion of crystalline zeolite in said matrix is in the range of about 5–20 wt. percent.

7. The composition of claim 1 wherein said two crystalline aluminosilicate zeolites comprise zeolite X and Y.

References Cited
UNITED STATES PATENTS

| | | | |
|---|---|---|---|
| 3,238,133 | 3/1966 | Voorhies, Jr. et al. | 208—264 |
| 3,267,023 | 8/1966 | Miale et al. | 208—111 |
| 3,546,095 | 12/1970 | Kittrell | 252—455 Z |

CARL F. DEES, Primary Examiner

U.S. Cl. X.R.

208—120